United States Patent
Feng

(10) Patent No.: US 11,614,867 B2
(45) Date of Patent: Mar. 28, 2023

(54) DISTRIBUTED STORAGE SYSTEM-BASED DATA PROCESSING METHOD AND STORAGE DEVICE

(71) Applicant: Huawei Technologies Co., Ltd., Guangdong (CN)

(72) Inventor: Yonggang Feng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1054 days.

(21) Appl. No.: 16/293,098

(22) Filed: Mar. 5, 2019

(65) Prior Publication Data

US 2019/0196728 A1 Jun. 27, 2019

Related U.S. Application Data

(63) Continuation of application No. PCT/CN2017/081339, filed on Apr. 21, 2017.

(30) Foreign Application Priority Data

Sep. 5, 2016 (CN) .......................... 201610807454.9

(51) Int. Cl.
*G06F 16/00* (2019.01)
*G06F 3/06* (2006.01)
*H04L 67/104* (2022.01)
*H04L 67/1097* (2022.01)

(52) U.S. Cl.
CPC .............. *G06F 3/0619* (2013.01); *G06F 3/06* (2013.01); *G06F 3/064* (2013.01); *G06F 3/067* (2013.01); *G06F 3/0613* (2013.01); *G06F 3/0643* (2013.01); *H04L 67/1051* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,617,568 A | 4/1997 | Ault et al. | |
| 8,219,807 B1* | 7/2012 | Danoyan | G06F 21/6281 |
| | | | 726/28 |
| 2008/0168529 A1* | 7/2008 | Anderson | G06F 21/577 |
| | | | 726/1 |

(Continued)

FOREIGN PATENT DOCUMENTS

| | | |
|---|---|---|
| CN | 102567438 A | 7/2012 |
| CN | 102937964 A | 2/2013 |

(Continued)

*Primary Examiner* — Hasanul Mobin
(74) *Attorney, Agent, or Firm* — Womble Bond Dickinson (US) LLP

(57) ABSTRACT

According to a distributed storage system-based data processing method and a storage device provided in the present disclosure, a storage node is selected as a primary storage node in a partition in the distributed storage system. During data reading, after receiving a read I/O request from an initiator, the primary storage node determines whether a target data object that the read I/O request requests to read on the primary storage node is trustworthy; and when the target data object is trustworthy, directly reads the target data object from the primary storage node and returns the target data object to the initiator of the read I/O request.

15 Claims, 12 Drawing Sheets

(56) References Cited

U.S. PATENT DOCUMENTS

| | | | |
|---|---|---|---|
| 2008/0320561 A1* | 12/2008 | Suit | H04L 63/126 709/224 |
| 2011/0191832 A1* | 8/2011 | Davis | H04L 12/4641 709/206 |
| 2011/0225362 A1* | 9/2011 | Leggette | G06F 12/1425 711/114 |
| 2012/0054252 A1* | 3/2012 | Olderdissen | G06F 11/1076 707/823 |
| 2012/0159099 A1 | 6/2012 | Lindamood et al. | |
| 2012/0254342 A1 | 10/2012 | Evans | |
| 2014/0344391 A1* | 11/2014 | Varney | H04L 47/822 709/213 |
| 2014/0372607 A1* | 12/2014 | Gladwin | G06F 3/067 709/224 |
| 2015/0067086 A1* | 3/2015 | Adriaens | H04L 47/70 709/212 |
| 2015/0127607 A1* | 5/2015 | Savage | G06F 16/245 707/693 |
| 2015/0180884 A1* | 6/2015 | Bhargava | G06F 21/606 726/4 |
| 2018/0004453 A1* | 1/2018 | Baptist | G06F 3/0659 |

FOREIGN PATENT DOCUMENTS

| | | |
|---|---|---|
| CN | 102981976 A | 3/2013 |
| CN | 105278877 A | 1/2016 |
| CN | 106406758 A | 2/2017 |

\* cited by examiner

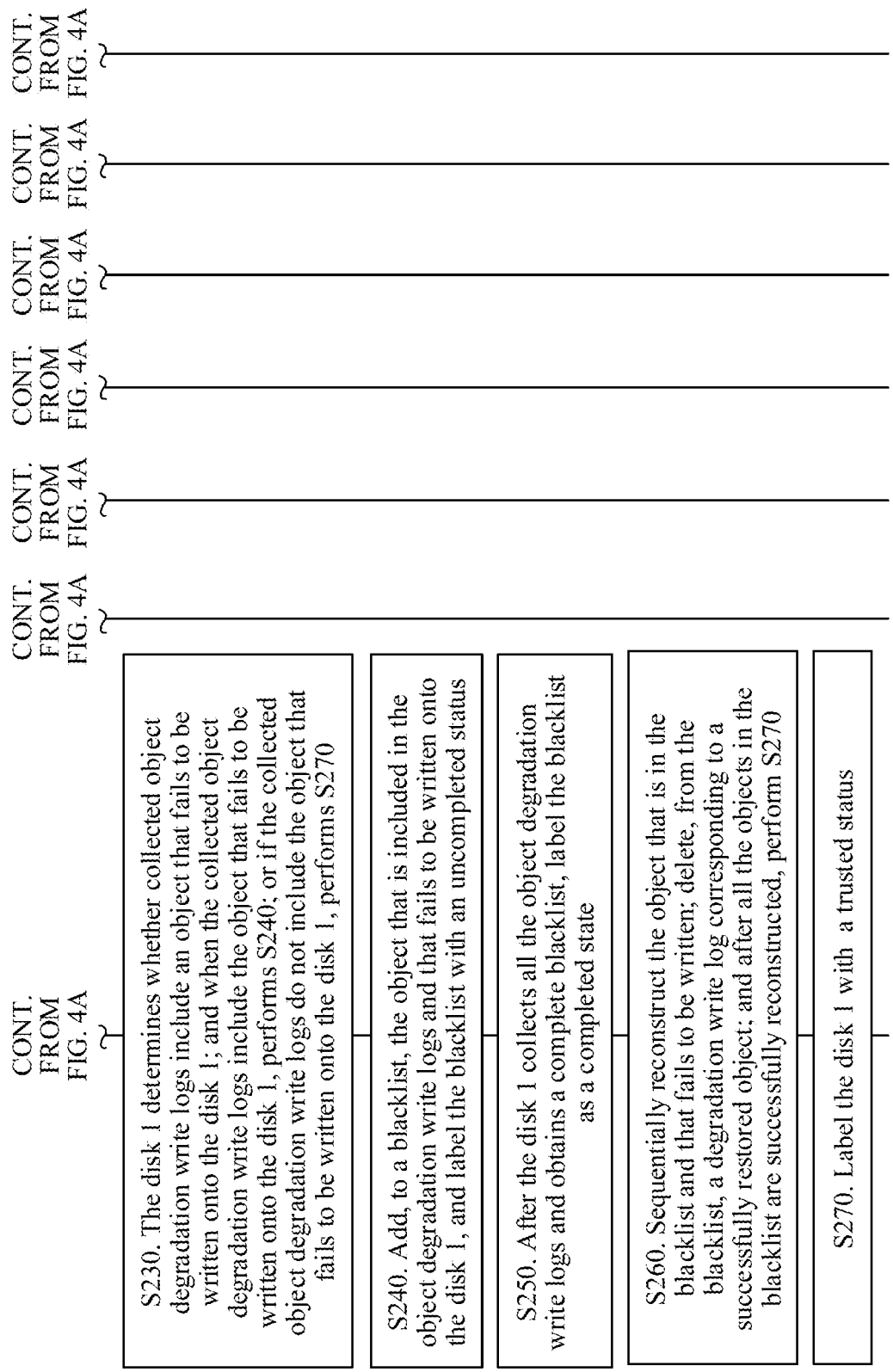

DISTRIBUTED STORAGE SYSTEM-BASED DATA PROCESSING METHOD AND STORAGE DEVICE

CROSS-REFERENCE TO RELATED APPLICATIONS

This application is a continuation of International Application No. PCT/CN2017/081339, filed on Apr. 21, 2017, which claims priority to Chinese Application No. 201610807454.9, filed on Sep. 5, 2016. The disclosures of the aforementioned applications are hereby incorporated by reference in their entireties.

TECHNICAL FIELD

The present disclosure pertains to the field of data read/write technologies, and in particular, relates to a distributed storage system-based data processing method and a storage device.

BACKGROUND

In a distributed storage system with redundant data, a plurality of copies of a redundant data object are stored on different storage devices. However, a plurality of copies of one data object can only be used for reading or only be used for writing at a same moment.

A quorum mechanism is a voting algorithm used to ensure data redundancy and final consistency in a distributed system. This mechanism has three key values: N, R, and W, and is also referred to as an NRW mechanism. Herein, N represents a quantity of copies of data, R represents a minimum quantity of copies that need to be read to complete a read operation, and W represents a minimum quantity of copies that need to be written to complete a write operation. When this mechanism is used, strong consistency can be ensured provided that R+W>N, because a storage node from which data is read overlaps with a storage node onto which data is synchronously written. For example, when N=5, W=3, and R=3, it indicates the following: There are five different copies of data in the system; for a write operation, the system needs to wait until the write operation is completed for at least three copies and then returns a write success state; and for a read operation, the system needs to wait until the read operation is completed for at least three copies and then returns a read success state.

Theoretically, when a data object in the distributed system is read, only one copy may be read. However, when the quorum mechanism is used, a quantity of copies that need to be read successfully in a read operation is the same as a quantity of copies that need to be written successfully in a write operation. In addition, to ensure that a required quantity of successfully read copies are obtained as soon as possible, generally, a read I/O request is sent to all storage nodes at which copies are located. Therefore, there is a relatively large quantity of read I/O requests, and read success latency increases, greatly reducing read performance.

SUMMARY

In view of this, the present disclosure provides a distributed storage system-based data processing method and a storage device, to resolve prior-art technical problems of a relatively large quantity of copies that need to be read successfully in a read operation, a long read success latency, and poor read performance.

According to a first aspect, the present disclosure provides a distributed storage system-based data processing method. During data reading, a primary storage node receives a read I/O request. Then, the primary storage node determines whether a target data object stored on the primary storage node is trustworthy. If the target data object stored on the primary storage node is trustworthy, only the target data object stored on the primary storage node needs to be read, and the target data object is directly sent to an initiator of the read I/O request, without reading the target data object from other storage nodes again in partition (PT) in which the primary storage node is located. The read I/O request is used to request to read the target data object in the PT in which the primary storage node is located, each PT includes a plurality of storage nodes, each storage node stores a data object, and each PT has one storage node used as a primary storage node.

Beneficial effects of the data processing method provided in the first aspect are as follows: During data reading, when the target data object stored on the primary storage node is trustworthy, the target data object needs to be read from the primary storage node only, and the read target data object is directly returned to the initiator of the read I/O request without reading data from other storage nodes in the current PT again. In comparison with a quorum mechanism, this greatly reduces a quantity of copies of a read operation, thereby reducing latency of the read operation and improving performance of the read operation.

In a first possible implementation, determining, by the primary storage node, whether the target data object stored on the primary storage node is trustworthy includes: determining a status of the primary storage node, where the status of the primary storage node includes a trusted state and an untrusted state; and if the status of the primary storage node is the trusted state, determining that the target data object stored on the primary storage node is trustworthy; or if the status of the primary storage node is the untrusted state, obtaining a blacklist on the primary storage node and determining whether the blacklist is complete, where the blacklist stores a data object that fails to be written onto the primary storage node; and if the blacklist is incomplete, determining that the target data object on the primary storage node is untrustworthy; or if the blacklist is complete, determining whether the blacklist includes the target data object; and if the blacklist includes the target data object, determining that the target data object on the primary storage node is untrustworthy; or if the blacklist does not include the target data object, determining that the target data object on the primary storage node is trustworthy.

In a second possible implementation, the method further includes: receiving, by the primary storage node, a primary storage node determining message, where the primary storage node determining message includes identification information of the primary storage node; when the primary storage node determines, based on the primary storage node determining message, that the primary storage node is a primary storage node, collecting an object degradation write log from all storage nodes in the PT in which the primary storage node is located, and labeling the primary storage node with the untrusted state, where the object degradation write log is a log used to record a storage node onto which a data object fails to be written, and is recorded on all storage nodes onto which the data object is successfully written; and if the object degradation write log includes a data object that fails to be written onto the primary storage node, selecting, from the object degradation write log, all data objects that fail to be written onto the primary storage node, to obtain the blacklist; or if the object degradation write log does not include a data object that fails to be written onto the primary storage node, labeling the primary storage node with the trusted state.

In a third possible implementation, the determining whether the blacklist is complete includes: obtaining, by the primary storage node, a status of the blacklist, where the status of the blacklist includes a completed state and an uncompleted state, the blacklist is in an uncompleted state in a process in which the primary storage node collects an object degradation write log, and the status of the blacklist becomes a completed state after object degradation write logs of all storage nodes in the PT in which the primary storage node is located are collected; and when the status obtained by the primary storage node is the completed state, determining that the blacklist is complete; or when the status obtained by the primary storage node is the uncompleted state, determining that the blacklist is incomplete.

In a fourth possible implementation, if the blacklist includes a data object that fails to be written onto the primary storage node, the method further includes: sequentially reconstructing, by the primary storage node, the data object that is in the blacklist and that fails to be written, and deleting, from the blacklist, a degradation write log corresponding to a successfully reconstructed data object; and after all data objects in the blacklist are successfully reconstructed, labeling the primary storage node with a trusted state.

According to a second aspect, the present disclosure provides a distributed storage system-based data processing method, including: receiving, by a primary storage node, a write I/O request, where the write I/O request is used to request to write a target data object into a PT in which the primary storage node is located, the PT includes a plurality of storage nodes, and each PT has one storage node used as a primary storage node; when the target data object fails to be written onto the primary storage node, directly sending a write failure response message to an initiator of the write I/O request; or when the target data object is successfully written onto the primary storage node, copying the target data object to another storage node in the PT in which the primary storage node is located; and when the primary storage node receives a preset quantity of write success response messages returned by storage nodes in the PT in which the primary storage node is located, returning a write success response message to the initiator of the write I/O request, where the preset quantity is determined based on a quorum mechanism and a quantity of storage nodes in the PT in which the primary storage node is located.

By using the distributed storage system-based data processing method provided in the second aspect, during data writing, if data fails to be written onto the primary storage node, a write failure response message is directly returned to the initiator of the write I/O request. If data is successfully written onto the primary storage node, a write success response message is returned to the initiator of the write I/O request only after the data is successfully written onto a preset quantity of other storage nodes in the current PT. Only in this way, it can be ensured that the data object in the current primary storage node is trusted data.

According to a third aspect, the present disclosure provides a storage device. The storage device is a primary storage node in a PT in a distributed storage system. The storage device includes: a first receiving module, configured to receive a read I/O request, where the read I/O request is used to request to read a target data object in the PT in which the primary storage node is located; a determining module, configured to determine whether the target data object stored on the storage device is trustworthy; a reading module, configured to: when the determining module determines that the target data object is trustworthy, read the target data object on the storage device; and a sending module, configured to send, to an initiator of the read I/O request, the target data object read by the reading module.

In a first possible implementation of the third aspect, the determining module includes: a first determining sub-module, configured to: determine a status of the storage device, where the status of the storage device includes a trusted state and an untrusted state; and if the status of the primary storage node is the trusted state, determine that the target data object stored on the primary storage node is trustworthy; a second determining sub-module, configured to: when the first determining sub-module determines that the status of the primary storage node is the untrusted status, obtain a blacklist on the primary storage node and determine whether the blacklist is complete, where the blacklist stores a data object that fails to be written onto the primary storage node; and if the blacklist is incomplete, determine that the target data object on the primary storage node is untrustworthy; and a third determining sub-module, configured to: when the second determining sub-module determines that the blacklist is complete, determine whether the blacklist includes the target data object; and if the blacklist includes the target data object, determine that the target data object on the primary storage node is untrustworthy; or if the blacklist does not include the target data object, determine that the target data object on the primary storage node is trustworthy.

In a second possible implementation of the third aspect, the storage device further includes: a second receiving module, configured to receive a primary storage node determining message, and determine, based on the primary storage node determining message, that the storage device is the primary storage node, where the primary storage node determining message includes identification information of the primary storage node; a collection module, configured to collect an object degradation write log from all storage nodes in the PT in which the primary storage node is located, and label the primary storage node with the untrusted state, where the object degradation write log is a log used to record a storage node onto which a data object fails to be written, and is recorded on all storage nodes onto which the data object is successfully written; a blacklist construction module, configured to select, from the object degradation write log, all data objects that fail to be written onto the primary storage node, to obtain the blacklist; and a trust labeling module, configured to: when the object degradation write log does not include a data object that fails to be written onto the primary storage node, label the primary storage node with the trusted state.

In a third possible implementation of the third aspect, the second determining sub-module is specifically configured to:

obtain a status of the blacklist, where the status of the blacklist includes a completed state and an uncompleted state, the blacklist is in the uncompleted state in a process in which the primary storage node collects an object degradation write log, and the status of the blacklist becomes a completed state after object degradation write logs of all storage nodes in the PT in which the primary storage node is located are collected; when the status of the blacklist is the completed state, determine that the blacklist is complete;

and when the status of the blacklist is the uncompleted state, determine that the blacklist is incomplete.

In a fourth possible implementation of the third aspect, if the blacklist includes a data object that fails to be written onto the primary storage node, the storage device further includes: a data reconstruction module, configured to sequentially reconstruct the data object that is in the blacklist and that fails to be written, and delete, from the blacklist, a degradation write log corresponding to a successfully reconstructed data object; and a state changing module, configured to: after all data objects in the blacklist are successfully reconstructed, label the primary storage node with the trusted state.

In a fifth possible implementation of the third aspect, the storage device further includes: a third receiving module, configured to receive a write I/O request, where the write I/O request is used to request to write a target data object into the PT in which the primary storage node is located; a data write module, configured to write the target data object into corresponding storage space in the storage device based on the write I/O request; a first returning module, configured to: when the target data object fails to be written, directly return a write failure response message to an initiator of the write I/O request;

a copying module, configured to: when the target data object is successfully written, copy the target data object to another storage node in the PT in which the primary storage node is located; and a second returning module, configured to: when the primary storage node receives a preset quantity of write success response messages returned by storage nodes in the PT in which the primary storage node is located, return a write success response message to the initiator of the write I/O request, where the preset quantity is determined based on a quorum mechanism and a quantity of storage nodes in the PT in which the primary storage node is located.

According to a fourth aspect, the present disclosure provides a storage device. The storage device is a primary storage node in a PT in a distributed storage system. The storage device includes: a receiver, configured to receive a read I/O request, where the read I/O request is used to request to read a target data object in the PT in which the primary storage node is located; a processor, configured to determine whether the target data object stored on the storage device is trustworthy; and if the processor determines that the target data object is trustworthy, read the target data object on the storage device; and a transmitter, configured to send the read target data object to an initiator of the read I/O request.

In a first possible implementation of the fourth aspect, the receiver is further configured to receive a write I/O request, where the write I/O request is used to request to write a target data object into the PT in which the primary storage node is located; the processor is further configured to write the target data object into corresponding storage space in the storage device based on the write I/O request; and if the target data object fails to be written, directly return a write failure response message to an initiator of the write I/O request; or if the target data object is successfully written, copy the target data object to another storage node in the PT in which the primary storage node is located, and receive a write success response message returned by the another storage node; and the transmitter is further configured to: when a preset quantity of write success response messages returned by other storage nodes are received, return a write success response message to the initiator of the write I/O request, where the preset quantity is determined based on a quorum mechanism and a quantity of storage nodes in the PT in which the primary storage node is located.

In the distributed storage system-based data processing method provided in the present disclosure, first, a storage node is selected as a primary storage node in any PT in the distributed storage system. The primary storage node receives a read I/O request, where the read I/O request is used to request to read a target data object in the PT in which the primary storage node is located. After receiving the read I/O request, the primary storage node first determines whether the target data object stored on the primary storage node is trustworthy; and if the target data object is trustworthy, directly reads the target data object from the primary storage node and returns the target data object to an initiator of the read I/O request. By using this method, during data reading, if the target data object on the primary storage node is trustworthy, the target data object needs to be read from the primary storage node only, without reading from other storage nodes. In comparison with the quorum mechanism, this greatly reduces a quantity of I/O requests of a read operation, thereby reducing latency of the read operation and improving performance of the read operation.

BRIEF DESCRIPTION OF DRAWINGS

To describe technical solutions in embodiments of the present disclosure more clearly, the following briefly describes the accompanying drawings required for describing the embodiments.

FIG. 4A and FIG. 4B are a schematic flowchart of a method for constructing a blacklist by a primary storage node according to an embodiment of the present disclosure;

DESCRIPTION OF EMBODIMENTS

Figure 1:
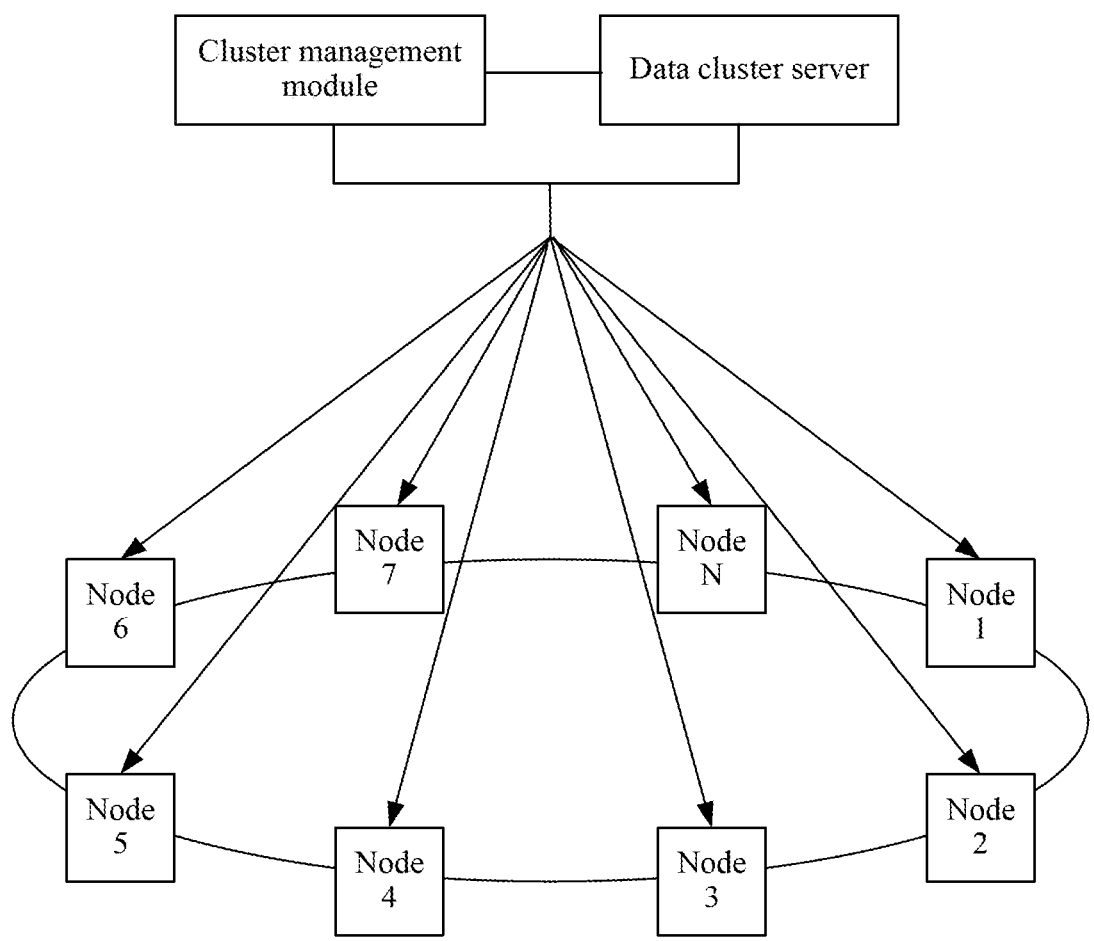
FIG. 1 is a schematic diagram of a distributed storage system according to an embodiment of the present disclosure.
Figure 2:
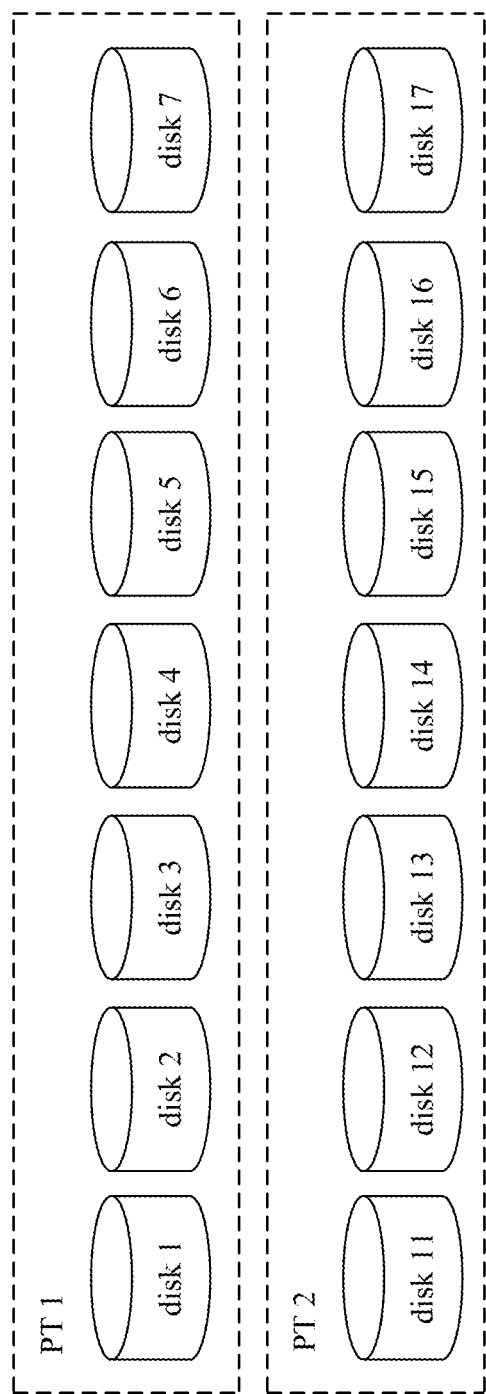
FIG. 2 is a schematic diagram of a PT according to an embodiment of the present disclosure.
Figure 3A:
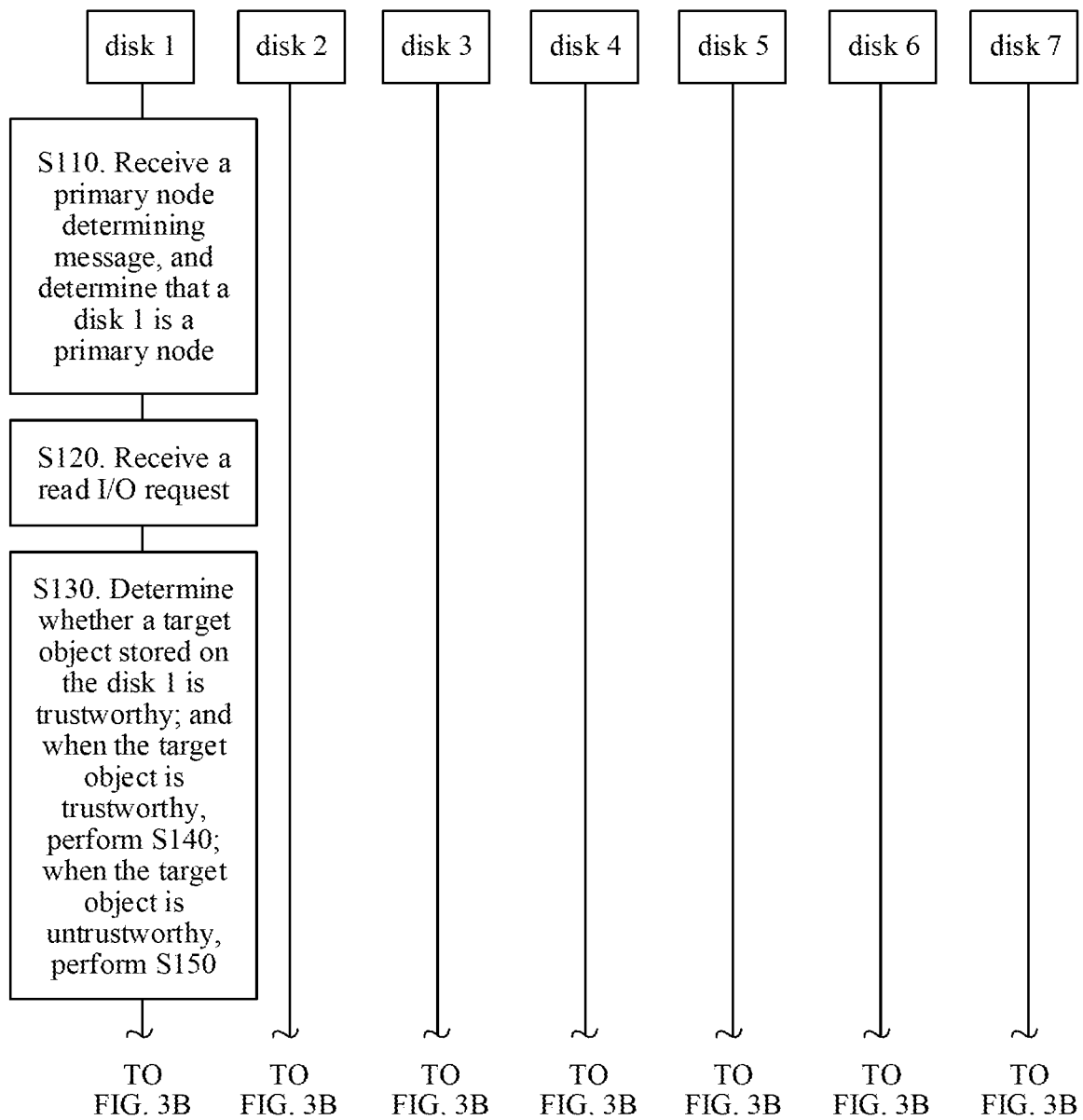
FIG. 3A and FIG. 3B are a schematic flowchart of a distributed storage system-based data processing method according to an embodiment of the present disclosure.
Figure 3B:
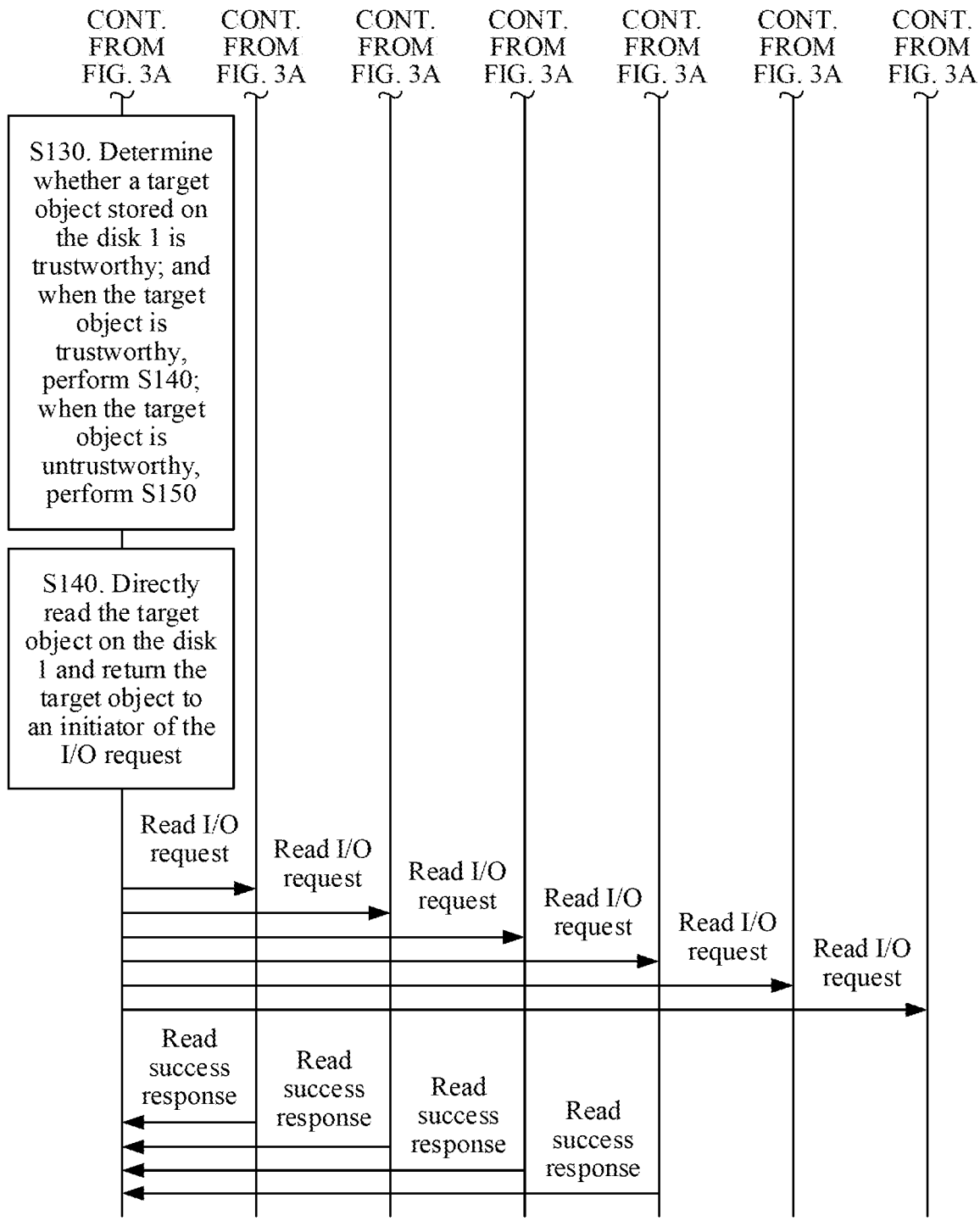

FIG. 3A and FIG. 3B are a schematic flowchart of a distributed storage system-based data processing method according to an embodiment of the present disclosure. This embodiment uses a PT shown in FIG. 2 as an example for description. It is assumed that a primary storage node in a PT 1 is a disk 1. The data processing method includes the following steps.

S110. The disk 1 receives a primary storage node determining message, and determines that the disk 1 is the primary storage node of the current PT.

A cluster management module determines a storage node (for example, the disk 1) in the PT 1 as the primary storage node of the PT 1, and sends a primary storage node determining message to the primary storage node (disk 1). The primary storage node determining message includes identification information (for example, a device unique identifier) of the primary storage node. The primary storage node determines, based on the identification information in the primary storage node determining message, that the primary storage node is the primary storage node of the PT.

S120. The disk 1 receives a read I/O request.

An initiator (for example, may be a PC client or an intelligent terminal client) of an I/O request sends the I/O request to a data cluster server in the distributed storage system. Then, the data cluster server sends the I/O request to the primary storage node (to be specific, the disk 1 in this embodiment) in the corresponding PT. The disk 1 determines a type of the I/O request. The I/O request includes a read I/O request and a write I/O request. The read I/O request is used to read a target data object in a storage device, and the write I/O request is used to write a target data object onto a storage device. The I/O request includes an object identifier of a data object requested to be read or written.

S130. The disk 1 determines whether a target data object that the read I/O request requests to read and that is stored on the disk 1 is trustworthy; and when the target data object is trustworthy, performs S140; when the target data object is untrustworthy, performs S150.

The disk 1 determines, based on an object identifier included in the read I/O request, whether an object that corresponds to the object identifier and that is stored on the disk 1 is trustworthy.

S140. The disk 1 reads the target data object stored on the disk 1 and returns the target data object to an initiator of the read I/O request.

If the target data object in the disk 1 is trustworthy, the target data object is directly read from the disk 1 and returned to the initiator of the I/O request.

S150. Read the target data object according to a quorum mechanism.

When the target data object in the disk 1 is untrustworthy, a read operation is performed according to the conventional quorum mechanism.

In this embodiment, the PT 1 includes seven storage nodes. According to a principle that R+W>7, it can be learned that R is 4 and W is 4. To be specific, the read operation is determined to be successful when at least four copies are successfully read.

In some application scenarios of the present disclosure, when the disk 1 is not faulty but the target data object stored on the disk 1 is untrustworthy, the disk 1 forwards the read I/O request to another storage node in the PT 1. In order to collect at least four read success responses as soon as possible, the read I/O request generally needs to be sent to other six storage nodes. As shown in FIG. 3A and FIG. 3B, the disk 1 forwards the read I/O request separately to a disk 2 to a disk 7.

Then, the disk 1 collects a read response result returned by each storage node, and determines that the read operation is successful when the disk 1 receives four read success response results. According to the quorum mechanism, it can be learned that the four read success results certainly include a latest target data object. When target data objects in the four collected read success results have different version numbers, a target data object corresponding to a latest version number is selected and sent to the initiator of the I/O request.

In some other application scenarios of the present disclosure, when the cluster management module detects that the disk 1 is faulty, the cluster management module reselects a storage node from the current PT as a primary storage node, and then resends the read I/O request to the new primary storage node.

According to the distributed storage system-based data processing method provided in this embodiment, a storage node is first selected as a primary storage node in any PT in the distributed storage system. After receiving the read I/O request, whether the target data object that is on the primary storage node in the corresponding PT and that the read I/O request requests to read is trustworthy is first determined. When the target data object is trustworthy, the target data object is directly read from the primary storage node and is returned to the initiator of the read I/O request. When the target data object on the primary storage node is untrustworthy, the read operation is performed according to the conventional quorum mechanism. By using this method, during data reading, when the target data object on the primary storage node is trustworthy, the target data object needs to be read from the primary storage node only. In this application scenario, data needs to be read from one storage node only. In comparison with the quorum mechanism, this greatly reduces a quantity of copies of the read operation, thereby reducing latency of the read operation and improving performance of the read operation.

Figure 4A:
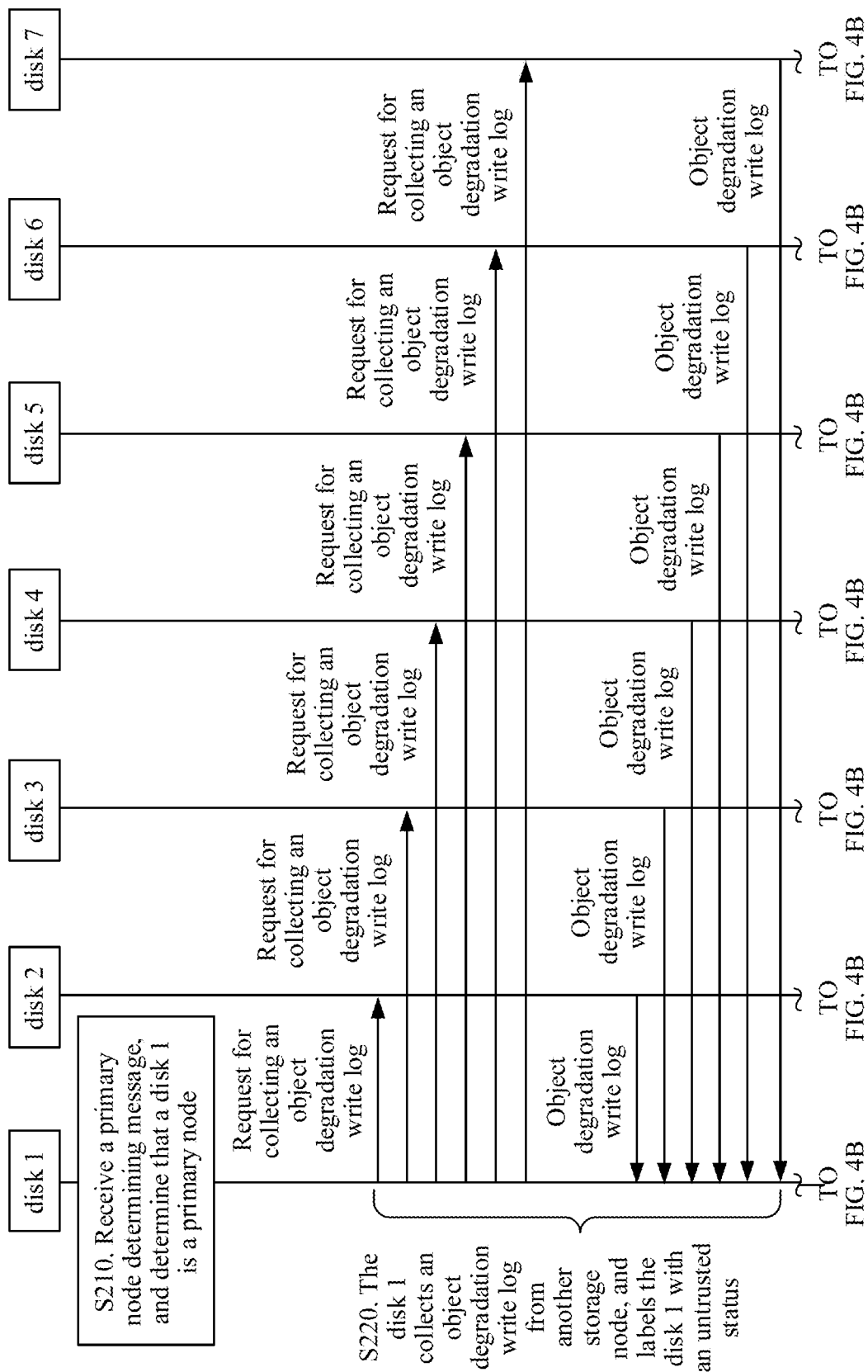

FIG. 4A and FIG. 4B are a schematic flowchart of a method for constructing a blacklist by a primary storage node according to an embodiment of the present disclosure. This embodiment still uses the PT shown in FIG. 2 as an example for description. This embodiment describes in detail a process in which the primary storage node constructs a blacklist. A blacklist is a list of data objects that fail to be written onto a storage node before the storage node becomes a primary storage node of a current PT. In other words, the data objects in the blacklist on the storage node are untrustworthy. This method includes the following steps between S110 and S120 in the embodiment shown in FIG. 3A and FIG. 3B.

S210. A disk 1 receives a primary storage node determining message, and determines that the disk 1 is a primary storage node of a current PT.

S220. The disk 1 collects an object degradation write log from another storage node in the current PT, and labels the disk 1 with an untrusted state.

The object degradation write log is a log indicating that a data object fails to be written onto a storage node, and is recorded on all storage nodes onto which the data object is successfully written. The object degradation write log records an object identifier of the data object that fails to be written, a disk onto which the data object fails to be written, a belonged PT, and information about a time at which the write failure occurs. For example, a data object 1 fails to be written onto a disk 2 at a T1 moment, and is successfully written onto all other storage nodes. Then, a log indicating that the data object 1 fails to be written onto the disk 2 is recorded in logs of the disk 1 and a disk 3 to a disk 7.

The disk 1 only needs collect object degradation write logs recorded in all other storage nodes in the current PT before the disk 1 becomes the primary storage node. The disk 1 sends a request for collecting an object degradation write log to all other nodes in the current PT, and receives an object degradation write log returned by each storage node. In a process of collecting the object degradation write logs, the disk 1 is labeled with the untrusted state. The untrusted state indicates that whether a data object in the disk 1 is complete is unknown.

S230. The disk 1 determines whether collected object degradation write logs include a data object that fails to be written onto the disk 1; and when the collected object degradation write logs include the data object that fails to be written onto the disk 1, performs S240; or when all the collected object degradation write logs do not include the data object that fails to be written onto the disk 1, performs S270.

In a process of collecting the object degradation write logs, the disk 1 determines whether the collected object degradation write logs include the data object that fails to be written onto the disk 1.

S240. Add, to a blacklist, the data object that is included in the object degradation write logs and that fails to be written onto the disk 1, and label the blacklist with an uncompleted state.

When the blacklist is in the uncompleted status, it indicates that the blacklist is incomplete, and whether a to-be-read data object exists in the blacklist is unknown.

S250. After the disk 1 collects all the object degradation write logs and obtains a complete blacklist, label the blacklist with a completed status.

S260. Sequentially reconstruct the data object that is in the blacklist and that fails to be written; delete, from the blacklist, a degradation write log corresponding to a successfully restored data object; and after all the data objects in the blacklist are successfully reconstructed, perform S270.

Data reconstruction is to restore, based on data object content on a storage node onto which a data object is successfully written, the data object on a storage node onto which the data object fails to be written. Specifically, the primary storage node (the disk 1) may actively read object content that corresponds to the to-be-restored data object and that is stored on the storage node onto which the data object is successfully written.

For example, data objects in the blacklist that fail to be written include a data object 1, a data object 2, and a data object 3. The data object 1 is copied to the disk 1 from a storage node onto which the data object 1 is successfully written. Similarly, the data object 2 is copied to the disk 1 from a storage node onto which the data object 2 is successfully written, and the data object 3 is copied to the disk 1 from a storage node onto which the data object 3 is successfully written.

S270. Label the disk 1 with a trusted state.

After all the data objects in the blacklist are reconstructed, the disk 1 is relabeled with the trusted status. When all the object degradation write logs collected by the disk 1 do not include a data object that fails to be written onto the disk 1, it is determined that the disk 1 does not include a data object that fails to be written. To be specific, all data objects in the disk 1 are trustworthy, and the disk 1 can be labeled with the trusted status.

In another application scenario of the present disclosure, when the cluster management module determines that the primary storage node disk 1 in the PT 1 is faulty due to a reason, the cluster management module reselects (based on an equilibrium principle that each storage node can be a primary storage node) a storage node from the PT 1 as a new primary storage node. The new primary storage node performs the procedure of S210 to S270 again after determining that the new primary storage node is the primary storage node.

In the data processing method provided in this embodiment, after determining that the disk 1 is the primary storage node of the current PT, the disk 1 collects the object degradation write log from the another storage node in the current PT, and selects a data object that fails to be written onto the disk 1 before the disk 1 becomes the primary storage node, to obtain the blacklist. During this period, the disk 1 is labeled with the untrusted status. Whether a target data object in the disk 1 is trustworthy needs to be further determined.

Figure 5:
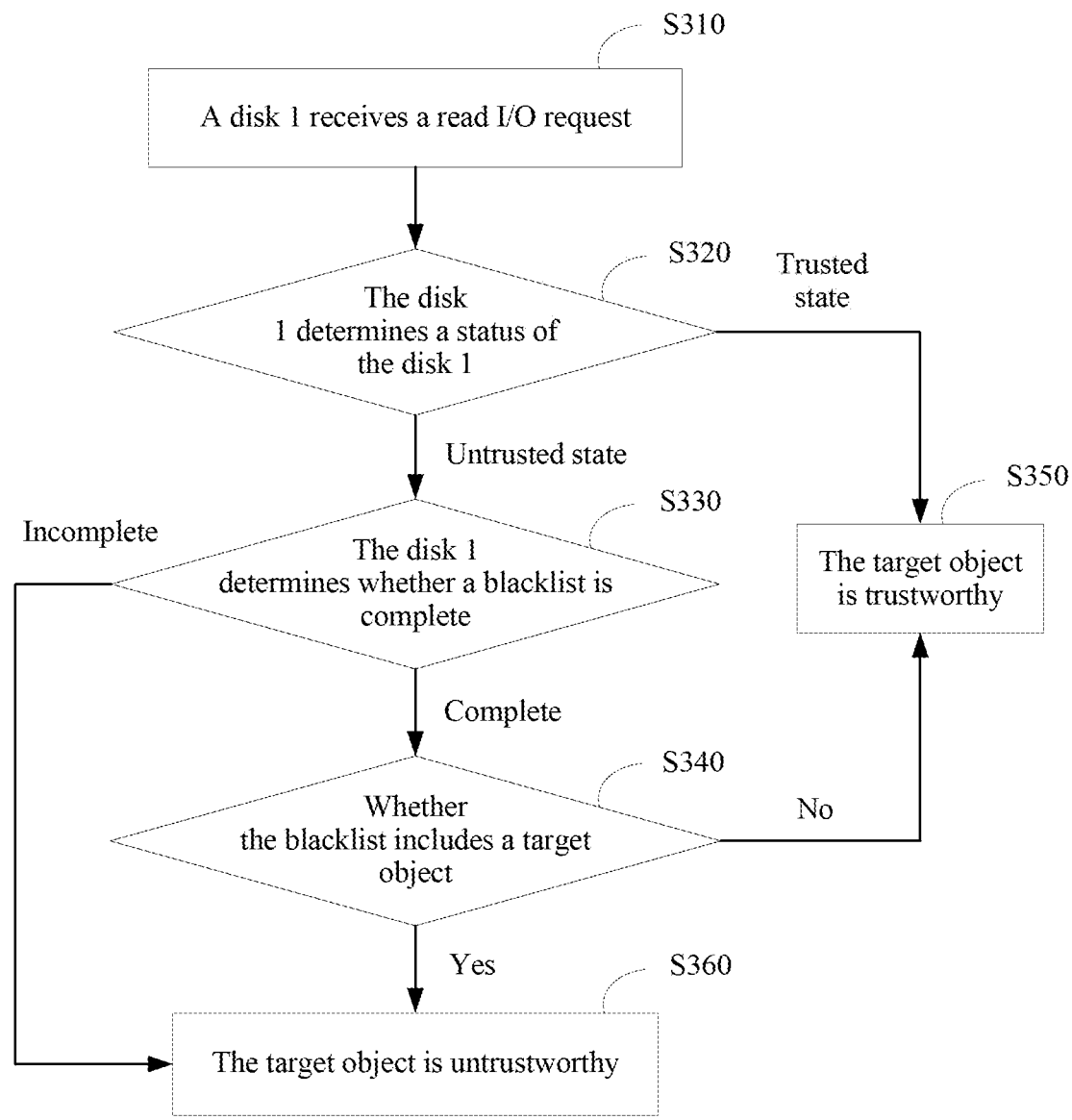
FIG. 5 is a schematic flowchart in which a primary storage node determines whether a target data object stored on the primary storage node is trustworthy according to an embodiment of the present disclosure.

FIG. 5 is a schematic flowchart in which a primary storage node determines whether a target data object stored on the primary storage node is trustworthy according to an embodiment of the present disclosure. In this method, whether a target data object on the primary storage node is trustworthy is determined based on the blacklist constructed in the embodiment shown in FIG. 4A and FIG. 4B. This embodiment still uses the PT shown in FIG. 2 as an example for description. A disk 1 in a PT 1 is the primary storage node. As shown in FIG. 5, the method may include the following steps:

S310. The disk 1 receives a read I/O request.

S320. The disk 1 determines a status of the disk 1, where the status of the primary storage node includes a trusted status and an untrusted status; and when the disk 1 is in the untrusted state, performs S330; or if the disk 1 is in the trusted status, performs S350.

S330. The disk 1 determines whether a blacklist corresponding to the disk 1 is complete; and when the blacklist is complete, performs S340; or if the blacklist is incomplete, performs S360.

S340. The disk 1 determines whether the blacklist includes a target data object that the read I/O request requests to read; and when the blacklist includes the target data object, performs S360; when the blacklist does not include the target data object, performs S350.

S350. The disk 1 determines that the target data object stored on the disk 1 is trustworthy.

S360. The disk 1 determines that the target data object stored on the disk 1 is untrustworthy.

In the process of determining whether the target data object on the primary storage node is trustworthy provided in this embodiment, the status of the primary storage node is first determined. When the primary storage node is in the trusted status, it is determined that the target data object on the primary storage node is trustworthy. When the primary storage node is in the untrusted status, whether the blacklist on the primary storage node is complete is determined. When the blacklist is complete, whether the blacklist includes the target data object is further determined. When the blacklist includes the target data object, it is determined that the target data object on the primary storage node is untrustworthy. When the blacklist does not include the target data object or the blacklist is incomplete, it is determined that the target data object on the primary storage node is trustworthy. After it is determined that the target data object on the primary storage node is trustworthy, the target data object needs to be read from the primary storage node only. This greatly reduces latency of a read operation, thereby improving read performance.

In this embodiment of the present disclosure, to reduce data read latency, a storage node is selected from a plurality of storage nodes in the PT as a primary storage node. On a premise that a target data object on the primary storage node is trustworthy, the target data object needs to be read from the primary storage node only. Correspondingly, during data writing, it needs to ensure that a data object is successfully written onto the primary storage node. The following describes a data write process in detail with reference to FIG. 6.

Figure 6:
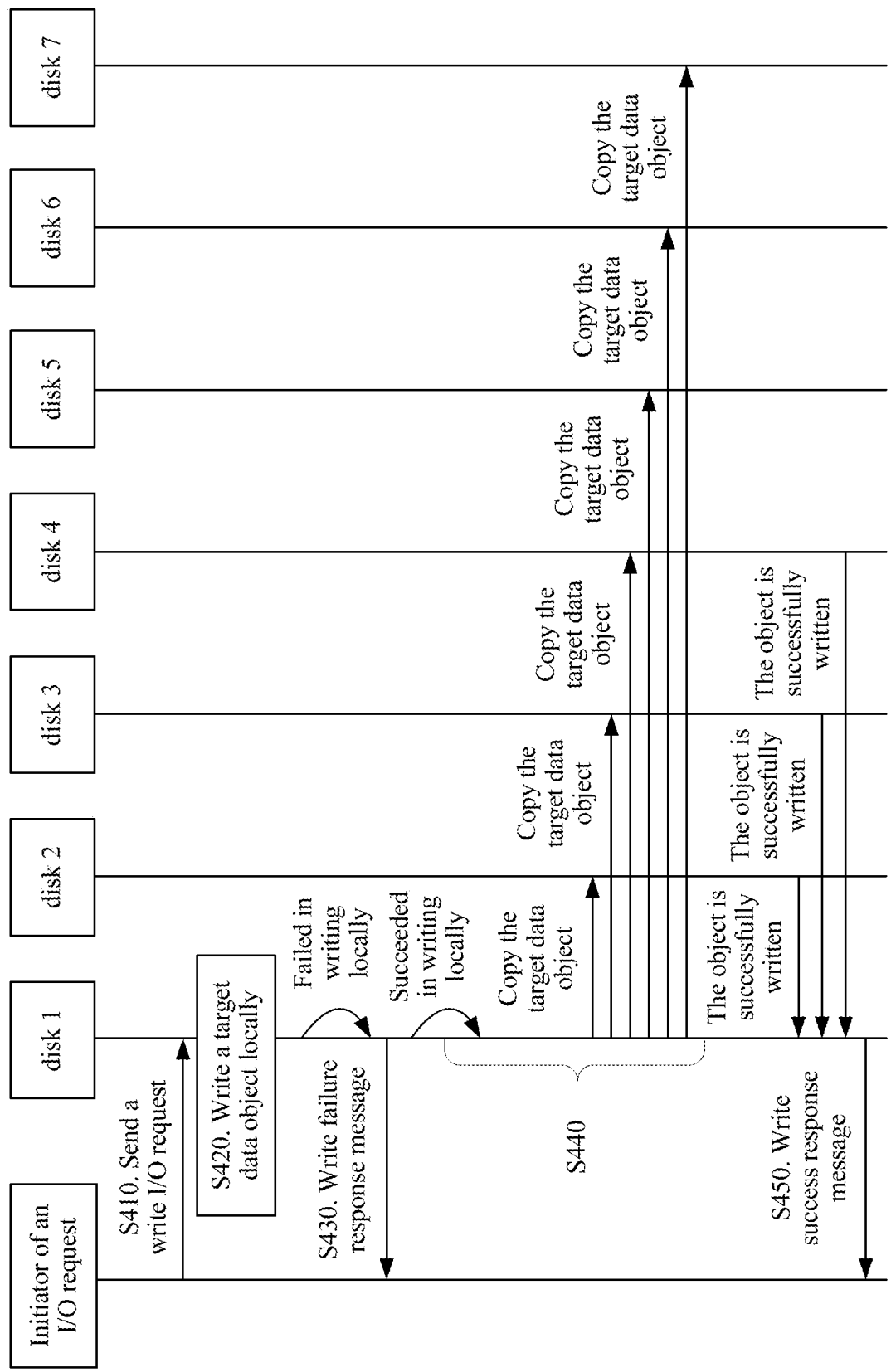
FIG. 6 is a flowchart of another distributed storage system-based data processing method according to an embodiment of the present disclosure.

FIG. 6 is a flowchart of another distributed storage system-based data write method according to an embodiment of the present disclosure. This method still uses the PT shown in FIG. 2 as an example for description. As shown in FIG. 6, the data write method may include the following steps:

S410. A disk 1 receives a write I/O request, where the write I/O request includes to-be-written target data object.

S420. The disk 1 writes the target data object locally.

S430. When the target data object fails to be written onto the disk 1, the disk 1 writes a write failure response message to an initiator of the write I/O request.

In some application scenarios of the present disclosure, when the write operation fails because the disk 1 is faulty, the cluster management module reselects another storage node from the current PT as a primary storage node. The cluster management module resends the write I/O request to the new primary storage node to perform a write operation.

In some other application scenarios of the present disclosure, when the disk 1 is not faulty, a retry request is initiated, to be specific, a write I/O request is initiated again.

S440. When the target data object is successfully written onto the disk 1, the target data object is directly copied to another storage node.

S450. After receiving at least three write success response results returned by other storage nodes, the disk 1 returns a write success response message to the initiator of the write I/O request.

The write operation is still performed according to a quorum mechanism. In addition, the primary storage node needs to be included in at least four storage nodes onto which the target data object is successfully written. To be specific, storage nodes onto which the target data object is successfully written need to include the primary storage node and three other storage nodes. In this case, the write operation is determined to be successful, and the write success response result is returned to the initiator of the write I/O request.

In the distributed storage system-based data write method provided in this embodiment, the primary storage node receives the write I/O request, and writes the target data object locally onto the primary storage node. When the target data object is successfully written onto the primary storage node, data further needs to be written onto another storage node. In addition, a quantity of storage nodes that include the primary storage node and onto which data is successfully written needs to meet a stipulation of the quorum mechanism. Only in this case, the write operation can be determined to be successful, and the primary storage node returns a write success response result to the initiator of the write I/O request. When the write operation on the primary storage node fails, the primary storage node directly returns a write failure response result to the initiator of the write I/O request. Ensuring a write success of the primary storage node can increase to a greatest extent a probability of successfully reading data from the primary storage node only.

To simplify description, all the foregoing method embodiments are described as a series of action combinations. However, a person skilled in the art should learn that the present disclosure is not limited to a sequence of the described actions. According to the present disclosure, some steps may be performed in another sequence or simultaneously.

Corresponding to the foregoing embodiments of the data processing method, the present disclosure further provides embodiments of corresponding storage devices.

Figure 7:
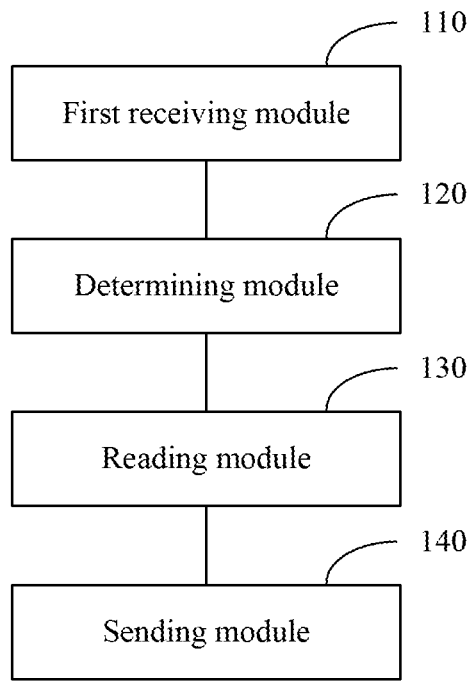
FIG. 7 is a block diagram of a storage device according to an embodiment of the present disclosure.

FIG. 7 is a block diagram of a storage device according to an embodiment of the present disclosure. The storage device is a primary storage node in a PT in a distributed storage system. As shown in FIG. 7, the storage device includes a first receiving module 110, a determining module 120, a reading module 130, and a sending module 140.

The first receiving module 110 receives a read I/O request. The determining module 120 determines whether a target data object on the storage device is trustworthy, where the target data object is a data object that the read I/O request requests to read. If the target data object is trustworthy, the reading module 130 reads the target data object from the storage device. The sending module 140 returns, to an initiator of the read I/O request, the target data object read by the reading module 130.

Figure 8:
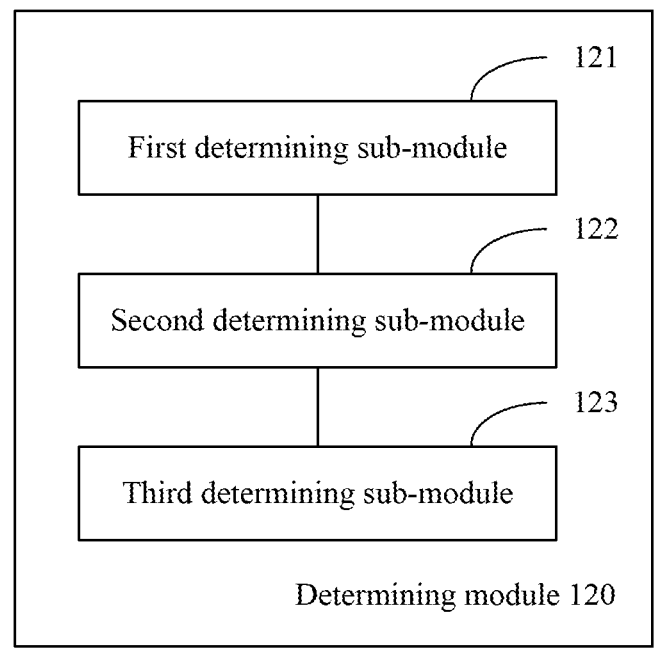
FIG. 8 is a block diagram of a determining module according to an embodiment of the present disclosure.

In some embodiments of the present disclosure, as shown in FIG. 8, the determining module 120 includes a first determining sub-module 121, a second determining sub-module 122, and a third determining sub-module 123.

The first determining sub-module 121 is configured to: determine a status of the storage device, where the status of the storage device includes a trusted status and an untrusted status; and when the status of the primary storage node is the trusted status, determine that the target data object stored on the primary storage node is trustworthy.

The second determining sub-module 122 is configured to: when the first determining sub-module determines that the status of the primary storage node is the untrusted status, obtain a blacklist on the primary storage node and determine whether the blacklist is complete, where the blacklist stores a data object that fails to be written onto the primary storage node; and when the blacklist is incomplete, determine that the target data object on the primary storage node is untrustworthy.

The second determining sub-module is specifically configured to: obtain a status of the blacklist, where the status of the blacklist includes a completed status and an uncompleted status, the blacklist is in the uncompleted state in a process in which the primary storage node collects an object degradation write log, and the status of the blacklist becomes a completed state after object degradation write logs of all storage nodes in the PT in which the primary storage node is located are collected; when the status of the blacklist is the completed status, determine that the blacklist is complete; and when the status of the blacklist is the uncompleted status, determine that the blacklist is incomplete.

The third determining sub-module 123 is configured to: when the second determining sub-module determines that the blacklist is complete, determine whether the blacklist includes the target data object; and when the blacklist includes the target data object, determine that the target data object on the primary storage node is untrustworthy; when the blacklist does not include the target data object, determine that the target data object on the primary storage node is trustworthy.

After receiving the read I/O request, the storage device provided in this embodiment first determines whether the target data object that is on the primary storage node in the corresponding PT and that the read I/O request requests to read is trustworthy; and when the target data object is trustworthy, directly reads the target data object from the primary storage node and returns the target data object to the initiator of the read I/O request. When the target data object on the primary storage node is untrustworthy, the read operation is performed according to the conventional quorum mechanism. By using the storage device, during data reading, when the target data object on the primary storage node is trustworthy, the target data object needs to be read from the primary storage node only. In this application scenario, data needs to be read from one storage node only. In comparison with the quorum mechanism, this greatly reduces a quantity of copies of the read operation, thereby reducing latency of the read operation and improving performance of the read operation.

Figure 9:
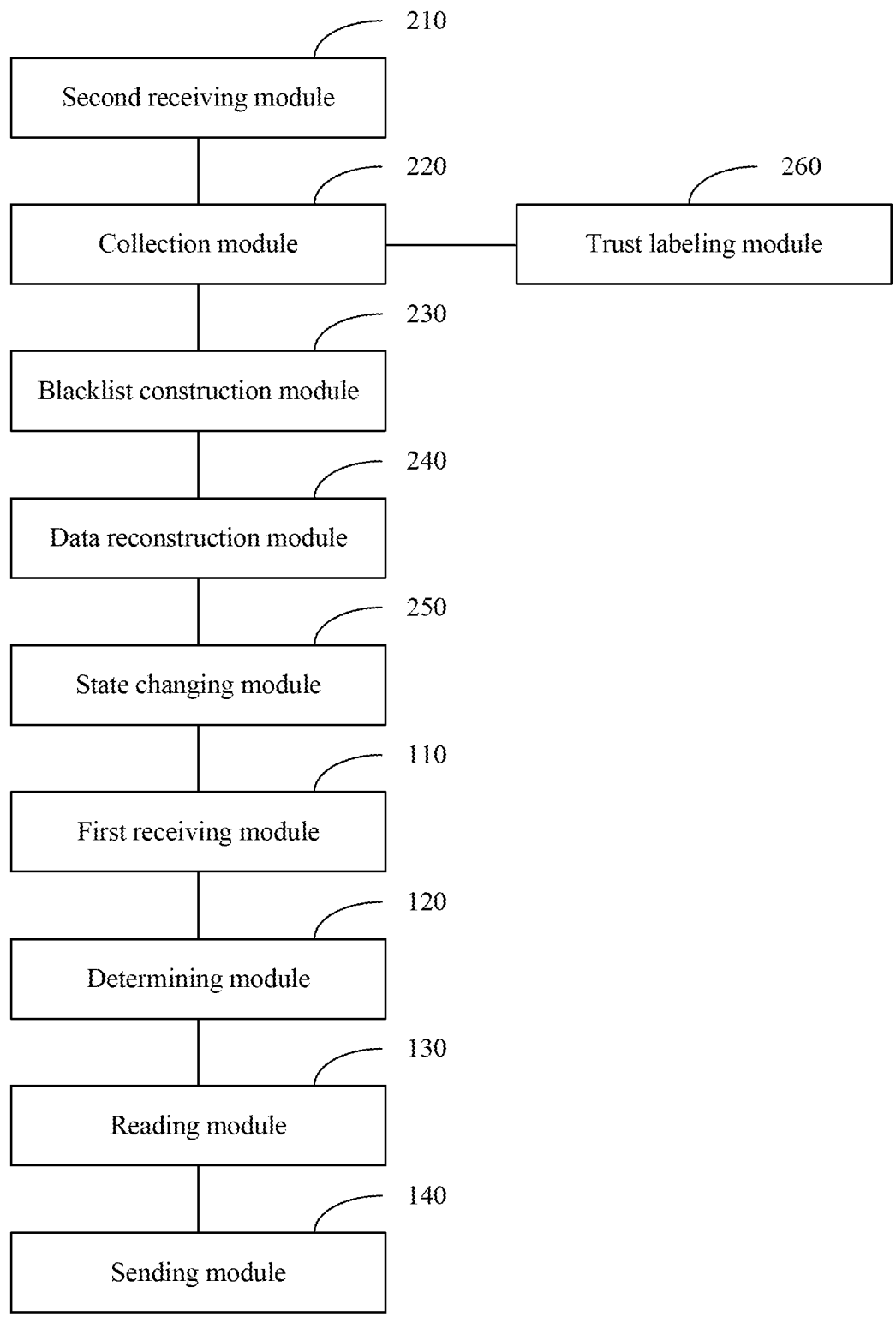
FIG. 9 is a block diagram of another storage device according to an embodiment of the present disclosure.

FIG. 9 is a block diagram of another storage device according to an embodiment of the present disclosure. Based on the embodiment shown in FIG. 7, the storage device further includes a second receiving module 210, a collection module 220, a blacklist construction module 230, a data reconstruction module 240, a state changing module 250, and a trust labeling module 260.

The second receiving module 210 is configured to receive a primary storage node determining message, and determine, based on the primary storage node determining message, that the storage device is the primary storage node.

The primary storage node determining message includes identification information of the primary storage node.

It should be noted that, after receiving the primary storage node determining message, the storage device may receive a read I/O request at any time. For example, the storage device may receive a read I/O request in a process of creating a blacklist by the primary storage node, may receive a read I/O request after a blacklist is created, or may receive a read I/O request after a data object in a blacklist is reconstructed.

The collection module 220 is configured to collect an object degradation write log from all storage nodes in the PT in which the primary storage node is located, and label the primary storage node with the untrusted state, where the object degradation write log is a log used to record a storage node onto which a data object fails to be written, and is recorded on all storage nodes onto which the data object is successfully written.

The blacklist construction module 230 is configured to select, from the object degradation write log, all data objects that fail to be written onto the primary storage node, to obtain the blacklist.

The data reconstruction module 240 is configured to sequentially reconstruct the data object that is in the blacklist and that fails to be written, and delete, from the blacklist, a degradation write log corresponding to a successfully reconstructed data object.

The state changing module 250 is configured to: after all data objects in the blacklist are successfully reconstructed, label the primary storage node with the trusted status.

The trust labeling module 260 is configured to: when the object degradation write log does not include a data object that fails to be written onto the primary storage node, label the primary storage node with the trusted status.

In the storage device provided in this embodiment, after determining that the storage device is the primary storage node of the current PT, the storage device collects an object degradation write log from another storage node in the current PT, and selects, from the object degradation write log, a data object that fails to be written onto the storage device before the storage device becomes the primary storage node, to obtain the blacklist. During this period, the storage device is labeled with the untrusted status. Whether the target data object stored on the storage device is trustworthy needs to be further determined.

Figure 10:
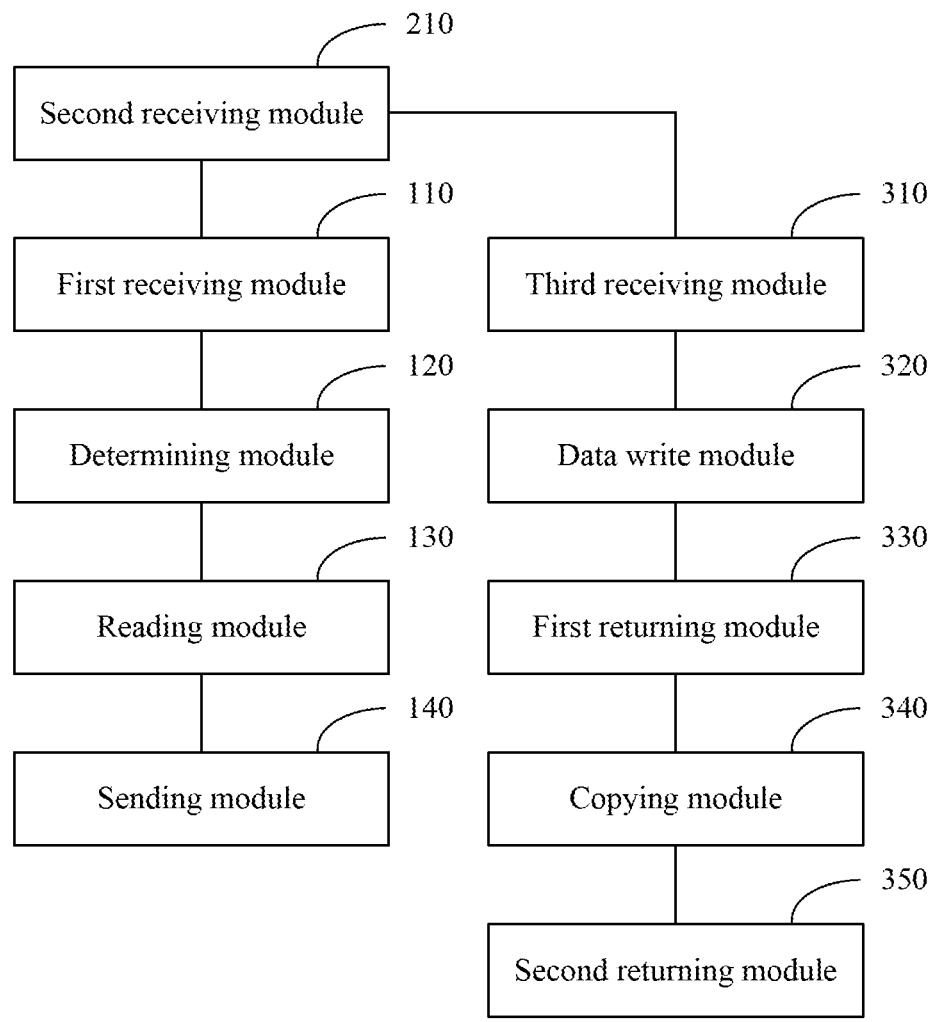
FIG. 10 is a block diagram of still another storage device according to an embodiment of the present disclosure.

FIG. 10 is a block diagram of still another storage device according to an embodiment of the present disclosure. Based on the embodiment shown in FIG. 7, the storage device further includes a second receiving module 210, a third receiving module 310, a data write module 320, a first returning module 330, a copying module 340, and a second returning module 350.

The second receiving module 210 is configured to receive a primary storage node determining message, and determine, based on the primary storage node determining message, that the storage device is the primary storage node.

The primary storage node determining message includes identification information of the primary storage node.

The third receiving module 310 is configured to receive a write I/O request, where the write I/O request is used to request to write a target data object into the PT in which the primary storage node is located.

The data write module 320 is configured to write the target data object into corresponding storage space in the storage device based on the write I/O request.

The first returning module 330 is configured to: when the target data object fails to be written, directly return a write failure response message to an initiator of the write I/O request.

The copying module 340 is configured to: when the target data object is successfully written, copy the target data object to another storage node in the PT in which the primary storage node is located.

The second returning module 350 is configured to: when the primary storage node receives a preset quantity of write success response messages returned by storage nodes in the PT in which the primary storage node is located, return a write success response message to the initiator of the write I/O request.

The preset quantity is determined based on a quorum mechanism and a quantity of storage nodes in the PT in which the primary storage node is located.

In the storage device provided in this embodiment, the primary storage node receives the write I/O request, and writes the target data object locally onto the primary storage node. When the target data object is successfully written onto the primary storage node, data further needs to be written onto another storage node. In addition, a quantity of storage nodes that include the primary storage node and onto which data is successfully written needs to meet a stipulation of the quorum mechanism. Only in this case, the write operation can be determined to be successful, and the primary storage node returns a write success response result to the initiator of the write I/O request. When the write operation on the primary storage node fails, the primary storage node directly returns a write failure response result to the initiator of the write I/O request. Ensuring a write success of the primary storage node can increase to a greatest extent a probability of successfully reading data from the primary storage node only.

Figure 11:
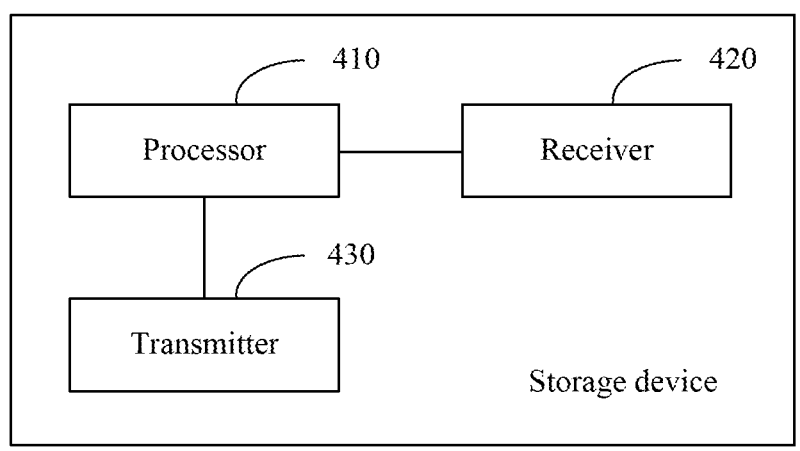
FIG. 11 is a block diagram of still another storage device according to an embodiment of the present disclosure.

FIG. 11 is a block diagram of still another storage device according to an embodiment of the present disclosure. The storage device is a primary storage node in a PT in a distributed storage system.

As shown in FIG. 11, the storage device includes a processor 410, and a receiver 420 and a transmitter 430 that are connected to the processor 410.

The receiver 420 is configured to receive an I/O request and provides the I/O request to the processor 410.

Types of the I/O requests include a read I/O request and a write I/O request. When the I/O request is a read I/O request, the read I/O request is used to read a target data object in the PT in which the primary storage node is located. When the I/O request is a write I/O request, the write I/O request is used to write a target data object into the PT in which the primary storage node is located.

The processor 410 is configured to perform the method in the embodiments shown in FIG. 3A and FIG. 3B to FIG. 6.

The transmitter 430 is configured to send the read target data object to an initiator of the read I/O request; or when the processor 410 receives a preset quantity of write success response messages returned by other storage nodes, return a write success response message to an initiator of the write I/O request.

After receiving the read I/O request, the storage device provided in this embodiment first determines whether the target data object that is on the primary storage node in the corresponding PT and that the read I/O request requests to read is trustworthy; and when the target data object is trustworthy, directly reads the target data object from the primary storage node and returns the target data object to the initiator of the read I/O request. When the target data object on the primary storage node is untrustworthy, the read operation is performed according to a conventional quorum mechanism. By using the storage device, during data reading, when the target data object on the primary storage node is trustworthy, the target data object needs to be read from the primary storage node only. In this application scenario, data needs to be read from one storage node only. In comparison with the quorum mechanism, this greatly reduces a quantity of copies of the read operation, thereby reducing latency of the read operation and improving performance of the read operation.

It should be noted that the embodiments in this specification are all described in a progressive manner, and each embodiment focuses on a difference from other embodiments. For same or similar parts in the embodiments, refer to these embodiments. An apparatus embodiment is basically similar to a method embodiment, and therefore is described briefly. For related parts, refer to partial descriptions in the method embodiment.

Finally, it should be noted that in this specification, relational terms such as first and second are only used to distinguish one entity or operation from another, and do not necessarily require or imply that any actual relationship or sequence exists between these entities or operations. Moreover, the terms "comprise", "include", or any other variants thereof are intended to cover a non-exclusive inclusion, so that a process, a method, an article, or a device that includes a list of elements not only includes those elements, but also includes other elements that are not expressly listed, or further includes elements inherent to such a process, method, article, or device. An element preceded by "includes one . . . " does not, without more constraints, preclude the presence of additional identical elements in the process, method, article, or device that includes the element.

What is claimed is:

1. A method of data processing in a distributed storage system, comprising:
   receiving, by a primary storage node in a partition in the distributed storage system, a read input/output (I/O) request from an initiator for reading a target data object stored on the primary storage node located in the partition, wherein the partition comprises a plurality of storage nodes, and one of the plurality of the storage nodes is the primary storage node;
   determining, by the primary storage node, whether the target data object stored on the primary storage node is trustworthy, wherein the determining whether the target object is trustworthy further comprises:
      determining a status of the primary storage node, wherein the status of the primary storage node is a trusted status or an untrusted status,
      when the status of the primary storage node is the untrusted status, obtaining a blacklist on the primary storage node and determining whether the blacklist is complete, wherein the blacklist stores a data object that fails to be written onto the primary storage node,
      when the blacklist is complete, determining whether the blacklist comprises the target data object, and
      determining that the target data object on the primary storage node is untrustworthy when the blacklist comprises the target data object, and that the target data
   object on the primary storage node is trustworthy when the blacklist does not comprise the target data object; and
   in response to determining that the target data object is trustworthy, reading the target data object stored on the primary storage node, and sending the target data object to the initiator.

2. The method of claim 1, further comprising:
   determining that the target data object stored on the primary storage node is trustworthy when the status of the primary storage node is the trusted status.

3. The method of claim 1, further comprising:
   determining that the target data object on the primary storage node is untrustworthy when the blacklist is incomplete.

4. The method of claim 1, further comprising:
   receiving, by the primary storage node, a primary storage node determining message comprising identification information of the primary storage node;
   collecting an object degradation write log from the plurality of storage nodes in the partition when the primary storage node determining message indicates the primary storage node, and labeling the primary storage node with the untrusted status, wherein the object degradation write log records each of the plurality of storage nodes onto which a data object fails to be written, and is recorded on each of the plurality of storage nodes onto which the data object is successfully written;
   selecting, from the object degradation write log, one or more data objects that fail to be written onto the primary storage node, to obtain the blacklist when the object degradation write log comprises a data object that fails to be written onto the primary storage node; and
   labeling the primary storage node with the trusted status when the object degradation write log does not comprise a data object that fails to be written onto the primary storage node.

5. The method of claim 3, wherein the determining of whether the blacklist is complete comprises:
   obtaining, by the primary storage node, a status of the blacklist, wherein the blacklist is incomplete when the primary storage node collects the object degradation write log, and becomes complete after the object degradation write logs of the plurality of storage nodes are collected.

6. The method of claim 3, wherein when the blacklist comprises a-the data object that fails to be written onto the primary storage node, the method further comprises:

sequentially reconstructing, by the primary storage node, the data object that is in the blacklist, and deleting, from the blacklist, a degradation write log entry corresponding to a successfully reconstructed data object; and labeling the primary storage node with the trusted status after all data objects in the blacklist are successfully reconstructed.

7. A storage device, wherein the storage device is a primary storage node in a partition in a distributed storage system, and the partition comprises a plurality of storage nodes, the storage device comprising:

a communications interface configured to receive a read input/output (I/O) request from an initiator for reading a target data object stored on the primary storage node; and a processor coupled to the communications interface and configured to perform operations comprising:

determining whether the target data object stored on the primary storage node is trustworthy, including:

determining a status of the primary storage node, wherein the status of the primary storage node is a trusted status or an untrusted status, when the status of the primary storage node is the untrusted status, obtaining a blacklist on the primary storage node and determining whether the blacklist is complete, wherein the blacklist stores a data object that fails to be written onto the primary storage node, determining whether the blacklist comprises the target data object when the blacklist is complete, and determining that the target data object on the primary storage node is untrustworthy when the blacklist comprises the target data object, and that the target data object on the primary storage node is trustworthy when the blacklist does not comprise the target data object, and in response to determining that the data object is trustworthy, reading only the target data object stored on the primary storage node, and sending the target data object to the initiator via the communications interface.

8. The storage device of claim 7, wherein the operations further comprise:

determining that the target data object stored on the primary storage node is trustworthy when the status of the primary storage node is the trusted status.

9. The storage device of claim 7, wherein the operations further comprise:

determining that the target data object on the primary storage node is untrustworthy when the blacklist is incomplete.

10. The storage device of claim 7, wherein the operations further comprise:

receiving a primary storage node determining message comprising identification information of the primary storage node;

collecting an object degradation write log from each of the plurality of storage nodes in the partition when the primary storage node determining message indicates that the primary storage node, and label the primary storage node with the untrusted status, wherein the object degradation write log records each of the plurality of storage nodes onto which a data object fails to be written, and is recorded on each of the plurality of storage nodes onto which the data object is successfully written;

seleting, from the object degradation write log, one or more data objects that fail to be written onto the primary storage node, to obtain the blacklist when the object degradation write log comprises a data object that fails to be written onto the primary storage node; and labeling the primary storage node with the trusted status when the object degradation write log does not comprise a data object that fails to be written onto the primary storage node.

11. The storage device of claim 9, wherein the operations further comprise:

obtaining a status of the blacklist, wherein the blacklist is incomplete when the primary storage node collects an object degradation write log, and becomes complete after the object degradation write logs of the plurality of storage nodes in the partition are collected.

12. The storage device of claim 9, wherein the operations further comprise:

sequentially reconstructing the data object that is in the blacklist, and delete, from the blacklist, a degradation write log corresponding to a successfully reconstructed data object; and labelling the primary storage node with the trusted status after all data objects in the blacklist are successfully reconstructed.

13. A non-transitory computer readable medium storing program instructions, when, when executed by one or more processors, cause the one or more processors to perform operations of data processing in a distributed storage system, the operations comprising:

receiving, by a primary storage node located in a partition in the distributed storage system, a read input/output (I/O) request from an initiator for reading a target data object stored on the primary storage node, wherein the partition comprises a plurality of storage nodes, and one of the plurality of the storage nodes is the primary storage node;

determining, by the primary storage node, whether the target data object stored on the primary storage node is trustworthy, wherein the determining whether the target object is trustworthy further comprises:

determining a status of the primary storage node, wherein the status of the primary storage node is a trusted status or an untrusted status, when the status of the primary storage node is the untrusted status, obtaining a blacklist on the primary storage node and determining whether the blacklist is complete, wherein the blacklist stores a data object that fails to be written onto the primary storage node, when the blacklist is complete, determining whether the blacklist comprises the target data object, and determining that the target data object on the primary storage node is untrustworthy when the blacklist comprises the target data object, and that the target data object on the primary storage node is trustworthy when the blacklist does not comprise the target data object; and in response to determining that the target data object is trustworthy, reading only the target data object stored on the primary storage node, and sending the target data object to the initiator.

14. The non-transitory computer readable medium of claim 13, the operations further comprising:

determining that the target data object stored on the primary storage node is trustworthy when the status of the primary storage node is the trusted status.

15. The non-transitory computer readable medium of claim 13, the operations further comprising:
    determining that the target data object on the primary storage node is untrustworthy when the blacklist is incomplete.

\* \* \* \* \*

UNITED STATES PATENT AND TRADEMARK OFFICE
CERTIFICATE OF CORRECTION

| | |
|---|---|
| PATENT NO. | : 11,614,867 B2 |
| APPLICATION NO. | : 16/293098 |
| DATED | : March 28, 2023 |
| INVENTOR(S) | : Yonggang Feng |

It is certified that error appears in the above-identified patent and that said Letters Patent is hereby corrected as shown below:

In the Claims

In Claim 5, Column 16, Line 64:
"collects the object,"
Should read:
"collects object"

In Claim 6, Column 17, Line 2:
"a-the data,"
Should read:
"the data"

In Claim 10, Column 17, Line 61:
"indicates that the,"
Should read:
"indicates the"

In Claim 13, Column 18, Line 60:
"reading only the,"
Should read:
"reading the"

Signed and Sealed this
Sixth Day of June, 2023

Katherine Kelly Vidal
*Director of the United States Patent and Trademark Office*